United States Patent [19]

Yoshizawa et al.

[11] Patent Number: 5,321,423
[45] Date of Patent: Jun. 14, 1994

[54] DOCUMENT INFORMATION SYSTEM AND DOCUMENT DATA TRANSFER AND DISPLAY METHOD

[75] Inventors: Satoshi Yoshizawa, Kawasaki; Kanji Kato, Tokorozawa; Seiji Kashioka, Hachioji; Atsushi Hatakeyama, Kokubunji; Junichi Higashino, Kodaira, all of Japan

[73] Assignee: Hitachi, Ltd., Tokyo, Japan

[21] Appl. No.: 627,814

[22] Filed: Dec. 14, 1990

[30] Foreign Application Priority Data

Dec. 15, 1989 [JP] Japan .................. 1-323722

[51] Int. Cl.$^5$ .............................. G09G 1/06
[52] U.S. Cl. ........................... 345/185; 395/145
[58] Field of Search ............ 340/720, 750, 799; 395/145, 146, 147, 148, 275, 600; 382/57; 358/402, 403, 404, 435–439, 468

[56] References Cited

U.S. PATENT DOCUMENTS

| | | | |
|---|---|---|---|
| 4,758,980 | 7/1988 | Tsunekawa et al. | 395/600 |
| 4,760,526 | 7/1988 | Takeda et al. | 395/600 |
| 4,768,144 | 8/1988 | Winter et al. | 395/600 |
| 4,800,431 | 1/1989 | Deering | 358/404 |
| 4,841,373 | 6/1989 | Asami et al. | 358/404 |
| 4,893,333 | 1/1990 | Baran et al. | 358/468 |
| 4,974,254 | 11/1990 | Perine et al. | 358/435 |
| 4,985,863 | 1/1991 | Fujisawa et al. | 382/57 |
| 5,014,186 | 5/1991 | Chisholm | 395/275 |
| 5,021,989 | 6/1991 | Fujisawa et al. | 395/275 |
| 5,068,888 | 11/1991 | Scherk et al. | 358/402 |
| 5,084,769 | 1/1992 | Miura | 358/403 |

FOREIGN PATENT DOCUMENTS 1134525 11/1987 Japan .

Primary Examiner—Ulysses Weldon
Assistant Examiner—M. FatahiYar
Attorney, Agent, or Firm—Antonelli, Terry, Stout & Kraus

[57] ABSTRACT

In a document information system and a method for realizing such a system, document data are transferred and displayed at a high speed. In response to an operation made from a terminal apparatus, the document data which have been stored via communication apparatus into a data storage apparatus are read out, and the read document data are temporarily stored before being transmitted by employing the communication apparatus. In the terminal apparatus, the received document data are temporarily stored as display data, and additionally the display data are swapped to a secondary storage device in such a case that a total amount of the temporarily stored data exceeds a predetermined capacity. Then, the display data may be transferred from either the terminal apparatus, or the secondary storage device to a display buffer and then may be displayed in a unit of representation.

27 Claims, 6 Drawing Sheets

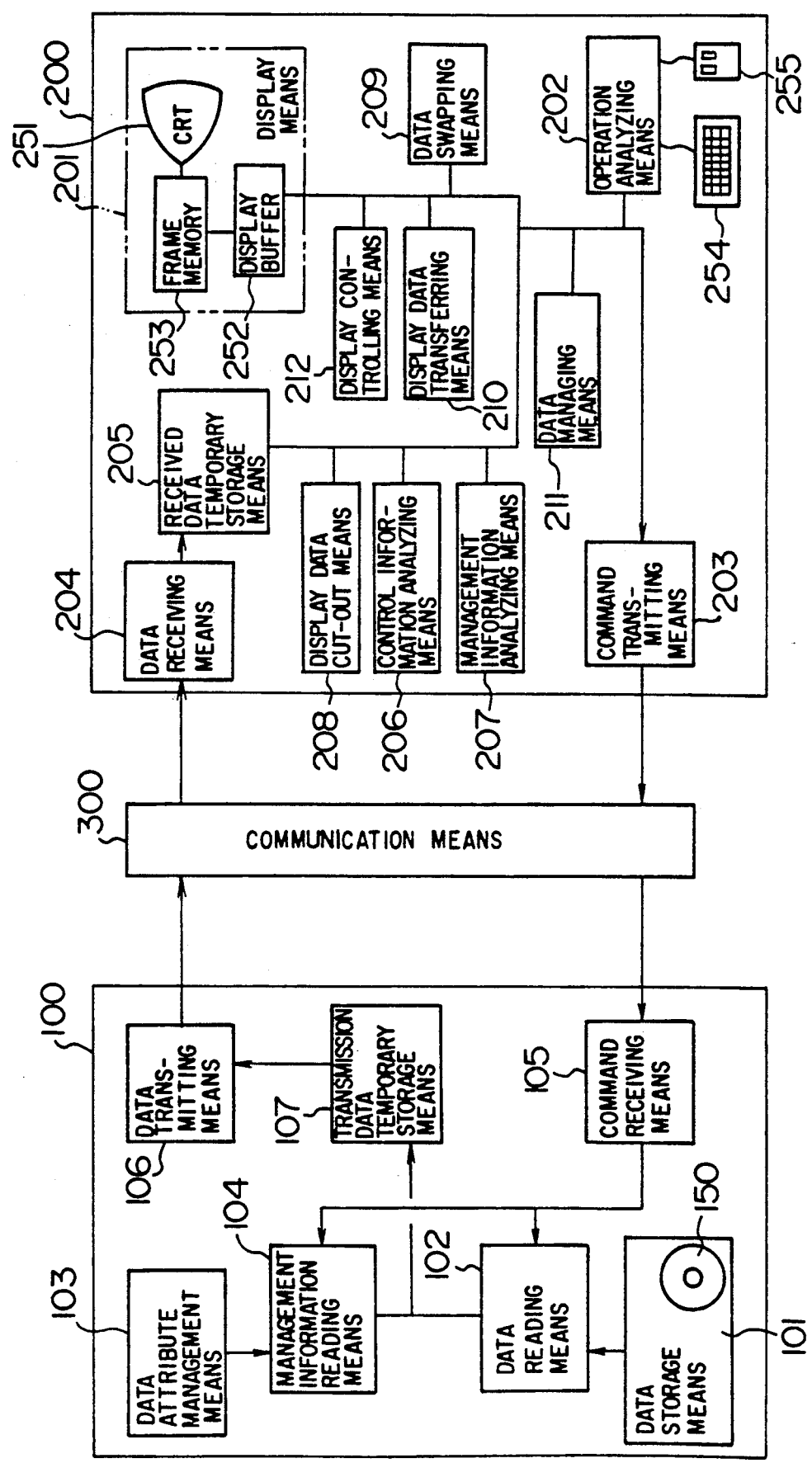

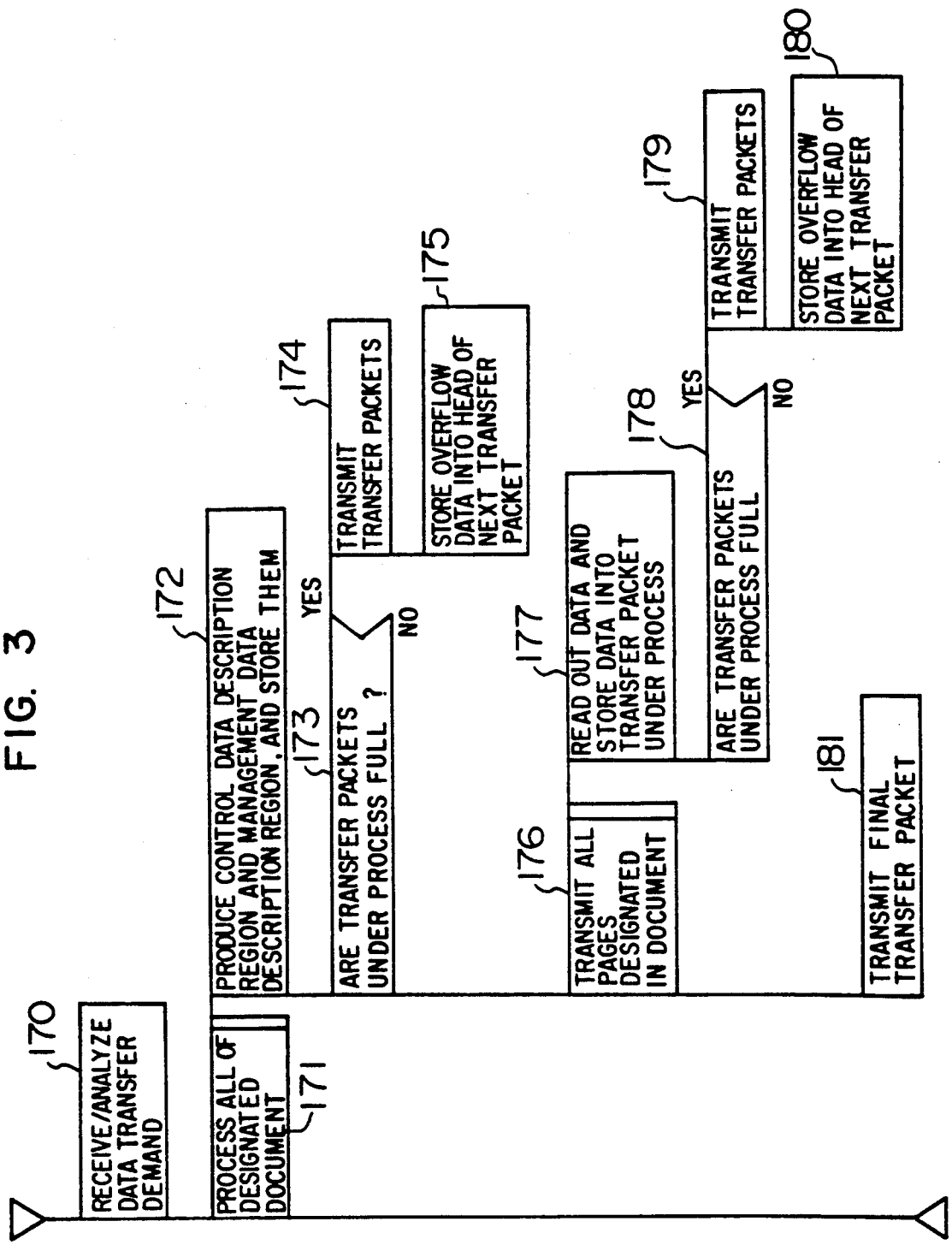

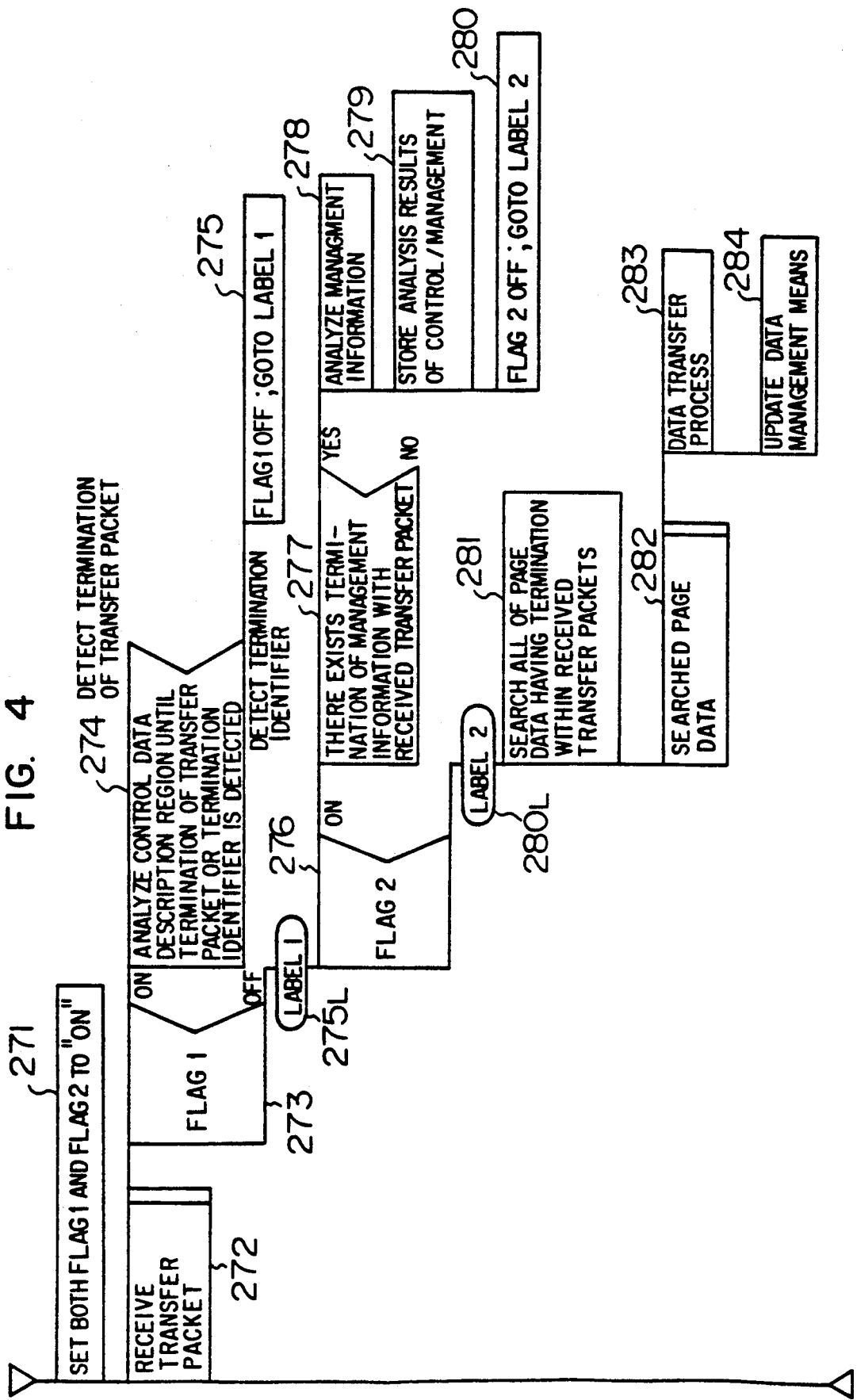

DOCUMENT INFORMATION SYSTEM AND DOCUMENT DATA TRANSFER AND DISPLAY METHOD

BACKGROUND OF THE INVENTION

The present invention relates to a paperless document information system in which a user may observe a content of a document which has been stored in an electronic image form on a CRT (cathode-ray tube) of a terminal device such as a workstation. More specifically, the present invention relates to a method for performing at a high speed, a transfer operation of document data from a data storage device to the terminal device, a display operation thereof on the terminal device, and a turning-page process operation for successively changing pages so as to be displayed thereon in a document information system having such a form that the data storage devices for electronically processing a large quantity of document data so as to be stored into a medium such as an optical disk, and also the terminal devices from which the user peruses this electronically processed document are distributively arranged and are linked by way of networks and the like.

As described in JP-A-61-255390, the conventional system is arranged by the frame memories having two pages so as to execute turning pages at a high speed. This frame memory stores not only page image data under display, but also page image data to be displayed subsequently for data utilization. With the above-described arrangement, since the turning-page operation may be realized by merely transferring the data between the frame memories, the page display change from the page under display to the subsequent page may be naturally executed.

When documents are represented as images, a total amount of image data become large. The aim of the above-described conventional system is to display image data from the frame memories at a high speed. However, no care is taken for such a point that the turning-page operation over the entire system, including the transfer operation of the document data from the storage device outside the terminal device to this terminal device, is performed at a high speed. Accordingly, more specifically in a large scale document information system where data storage devices, terminal devices and the like have been distributively arranged, there are some possibilities that a response time for a user may be prolonged since the user issues a display command until the data is actually displayed. Shortening such a response time to the display demand issued from the user may constitute an important and necessary element in order to make the system more comfortable. To achieve a large-scale document information system, both the transfer and display operations of the document data must be carried out at a high speed.

Furthermore, since the management information data used for managing the attributes or the like of the documents have been stored at the side of the data storage device in the conventional distributing document information system, the turning-page operation could not be performed at a high speed in such a manner that a selection is freely made between the turning-page operation physically designated by the user based upon the page number of the document data, and also the turning-page operation logically designated by the user based upon the content attributes of the document data, e.g., "claim" and "figure" of a patent document. As apparent from the foregoing descriptions, both of these turning-page operations must be provided to make document information systems more comfortable for any users.

SUMMARY OF THE INVENTION

An object of the present invention is to provide such a document information system, in particular, such a system where data storage devices and terminal devices have been distributively arranged, in which a response time since document data is transferred from the data storage device to the terminal device until the document data is displayed on the terminal data is displayed on the terminal device may be shortened, and also turning-page operation of the document data may be realized at a high speed by employing a physical, logical or arbitrary method.

To solve the above-described problems, a document information system according to a best mode of the present invention employs the following means.

First, in the data storage device, when the document data is transferred in a unit of page, since capacities of the respective data are not always constant, there are some possibilities that the data each having small capacity are repeatedly transferred. As a result, a ratio of overheads occurring when the data are actually transferred, to the overall transfer operation becomes high. First of all, to reduce the overheads to thereby increase the transfer efficiency, a command reception means accepts the transfer command in a unit of document. Also, the data transmission is not carried out in a unit of page according to the invention, and therefore there is provided a transmission data temporary storage means for temporarily storing therein the data before the data transmission.

Secondly, even when a byte number of transfer operations is increased by employing the above-described storage means so as to reduce the overheads, a time interval at which image data can be actually received at the terminal device side is prolonged, whereby the turning-page operation may not be performed in a high speed. As a consequence, there is further provided a data transmission means for sequentially transmitting data to the terminal device at a time instant when an amount of the data stored in the transmission data temporary storage means reaches a predetermined transfer amount.

Thirdly, management information of a document is transferred together with image data in order that a user can perform the turning page operation of the document data on the terminal device by employing both of physical and logical methods.

Then, there is first employed a received data temporary storage means for temporarily storing therein the image data received from the data storage device so as to be able to transfer the received image data to the display means for a display purpose at a high speed.

Further, a data swapping means is secondly provided in which the display data is stored in a secondary storage device in case that a total amount of received data exceeds a capacity of the above-described received data storage means.

A multiple display frame buffer is thirdly provided whereby a plurality of images may be stored in the display means in order to realize a high-speed image representation.

A display data transmission means is fourthly employed in order that the image data having high probability to which a transfer demand may be issued by the turning-page operation has been transferred to the display means, and conversely, the image data having low probability to which the transfer demand may be issued has been transferred to the data swapping means.

Also, a data management means is fifthly employed in order that the management information extracted from the received data is stored, a management is made to the image data which have arrived in the terminal device, and the turning page operation of the document data may be carried out at a high speed by utilizing both of the physical and logical methods by a user.

Then, various operations or effects according to the present invention will now be described.

First of all, in the data storage device, after the data to be transmitted to the terminal device are sequentially read out from the data storage device having a large memory capacity such as an optical disk by the data reading means, these data are not immediately transferred to the terminal device, but are temporarily stored into the transmission data temporary storage means.

There may be a problem that a transfer efficiency is lowered due to the transfer overhead while transferring the data. This transfer overhead is directly proportional to a quantity of practical transfer operations.

Since the data are temporarily stored into the transmission data temporary storage means, there is no possibility that the data having small capacities are no longer repeatedly transferred, as compared with such a case that the data are transferred, for instance, in a unit of page. As a result, the data transfer operation may be performed at a high speed, since a ratio of the transfer overhead occurring every time the data are actually transferred, to the overall transfer operation is lowered.

Secondly, at a time instant when an amount of stored data reaches a predetermined transfer amount, the stored data are sequentially transferred by the data transmission means through the transfer means to the terminal device. As a consequence, the data may be transferred through the network in a certain unit, irrelevant to the sizes of the read data, and also the data capable of being displayed at the terminal device side may be successively received, whereby the highspeed turning-page operation may be realized.

The image data received from the data storage device are first stored in the received data temporary storage means in the terminal device. To display the image data which have been stored into the received data temporary storage means, the image data are merely transferred from a memory employed in this storage means to another memory employed in the display means, so that these image data may be displayed on the display device at a high speed.

Secondly, since there is provided the data swapping means for swapping, or saving such data which has overflown the received data temporary storage means, or has not yet been stored into the display buffer, even when the display demand for the overflown data is subsequently issued from a user, the data is no longer required to be transferred through the network, but is merely transferred from the secondary storage device employed in the data swapping means to the display means, thereby achieving a highspeed data representation.

Thirdly, there are employed a plurality of display buffers in the display means by which the image data being not displayed presently may be stored therein. To display the image data being stored in these buffers, only this image data is simply transferred to the frame buffers, so that the image data may be displayed in a high speed.

Fourthly, since the display data transferring means has transferred the image data in accordance with the probability of the display demand, the probability of the image data which have been stored in the display buffer when the data having the higher probability for the display demand is requested, is increased, whereby the highspeed image display may be realized.

Fifthly, in the data management means, a management is carried out for both the management information extracted from the received data and also the destinations of the image data within the terminal device. Referring now to the management information, the destination of the relevant image data may be immediately searched based upon both of the physical and logical demands. As a consequence, the turning-page operation may be realized by accepting both of the demands.

Other objects and characters of the present invention will become apparent from the detailed description to follow taken in conjunction with the appended claims.

BRIEF DESCRIPTION OF THE DRAWINGS

FIG. 1 is a schematic block diagram for showing an arrangement of a document information system according to a preferred embodiment of the present invention;

FIG. 3 is a PAD diagram for representing one example of process operation performed within a data storage device;

FIG. 4 is a PAD diagram for indicating one example of process operation executed in terminal device;

DESCRIPTION OF THE PREFERRED EMBODIMENTS

Figure 2A:
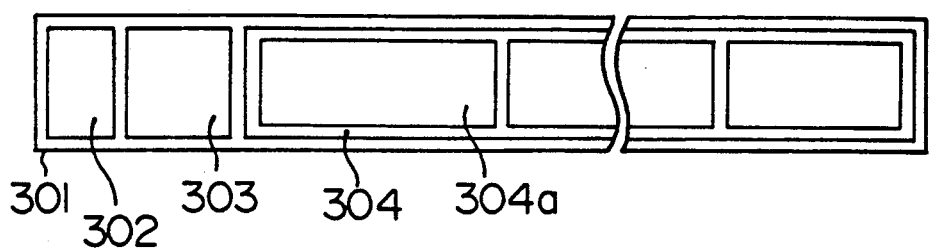
FIGS. 2A, 2B and 2C illustrate a packet hierarchical structure of data.

A preferred embodiment of the present invention will now be described.

In FIG. 1, there is shown a document information system constructed of a data storage device 100 for storing therein a large quantity of document data so as to manage the document data; a terminal device 200 for displaying the document data in accordance with a request made by a user; and communication means 300 for performing data communication.

The data storage device 100 comprises the following means. A data storage means 101 includes a large-capacity storage medium 150 such as an optical disk, and electronically processes document data, thereby storing the document data in an image form of the like. Readout operation of the document data stored in the data storage means 101 is carried out by a data reading means 102. A function of a data attribute management means 103 is to manage an attribute of document data stored in the data storage means 101. It should be noted in this specification that an attribute of document data implies a content attribute of each page. For instance, in case of a patent document, there are attributes such as a page of "claim" and a page of "figure". A management information reading means 104 refers to and reads out attribute information which has been stored in the data attribute management means 103. A command reception means 105 is such a means to receive and analyze the document data which has been transferred via the communication means by the terminal device 200. A data transmission means 106 is provided to transmit the data via the communication means 300 to the terminal device 200. A transmission data storage means 107 is such a means for temporarily storing therein document data, management information data and the like which have been read out by the data reading means 102 and management information reading means 104 before the data transmission means 106 actually performs transmission process operation. It should be understood that the management information corresponds to information for managing a page attributed and the like within a document. Also, control information corresponds to such an information that a content, a capacitance, a transfer sequence and the like of data which is transmitted by the data storage device 100 to the terminal device 200, are described. Since the transmission data storage means 107 is employed, a unit of data transmitted by the data transmission means 106 does not depend upon the individual data such as image data unit for each page. As a result, it can be avoided to perform such a process operation that image data having a small capacity is repeatedly transmitted and therefore overheads occurring during the data transmission can be reduced.

The terminal device 200 comprises the below-mentioned means. A display means 201 is to display document data and includes a CRT (cathode-ray tube) 251, a display buffer 252 capable of storing display data, and a frame memory 253. Display data is displayed on the CRT 251 in such a manner that data which has been temporarily stored into a display buffer 252 is transferred to a frame memory 253. The display buffer 252 owns a memory capacity capable of temporarily storing a plurality of image data, and may transfer arbitrary data among the stored image data to a frame memory 253. As a consequence, the image data which has been already stored in the display buffer 252 may be displayed at a high speed.

Any user produces a command of image representation sentation and the like with respect to the system by operating a keyboard 254 and a mouse 255. An operation analyzing means 202 fetches user operations made by the keyboard 254 and mouse 255 so as to analyze these user operations, and also produces a readout command of data for the data storage device 100. The readout command is transmitted by a command transmitting means 203 to the data storage device 100. It should be noted that although only one data storage device 100 is employed in the data storage device 100 in the preferred embodiment shown in FIG. 1, a plurality of data storage devices may be employed in a more large-scale system and may be connected to the communication device 300. In this case, the readout command may be transferred to all of the data storage devices 100, or may be transferred to each of the data storage devices 100, while investigating these storage devices whether or not the document data has been stored for each of documents. In the latter case, it is necessary to manage information for classifying the data which has been stored into each of the data storage device 100 at the side of the terminal device 200. As to this classification, for instance, a laid-open publication number and the like may be utilized in a patent document.

A data receiving means 204 is such a means for receiving document data which has been transmitted by the data storage device 100. A received data storage means 205 is such a means for temporarily storing received data. The received data is constructed of control information, management information and a display data main body. A control information analyzing means 206 is such a means for analyzing the received control information. Also, a management information analyzing means 207 is such a means for analyzing management information which has been received by a management information analyzing means 207. A display data cutout means 208 is such a means for cutting out display data among the received data.

A data swapping means 209 includes a secondary storage device 219 (not shown) such as a magnetic disk apparatus, and is such a means for swapping, or saving the above-described display data to the secondary storage device 219. A display data transfer means 210 is such a means for transferring the display data from the received data temporarily means 205 and data swapping means 209 to the display buffer 252. A data management means 211 corresponds to a means for producing a document data management structure based upon both analysis results of the control information analyzing means 206 and management information analyzing means 207, and for managing the data which has been previously transferred to the terminal device 200. It should be noted that the document data management structure implies such a structure for managing the page attribute or the like within the document and for managing the storage position of the data within the terminal device 100. The document data management structure will be described more in detail. A display control means 212 is such a means for controlling a display data transferring means 210 so as to control data transmission and the like with the terminal device 200, while referring to a data managing means 211.

The communication means 300 corresponds to a communication line with a network form. Furthermore, other devices such as a database retrieving device is connected to the communication device 300. In particular, the present invention is directed to a document information system having such a distributed type structure. It should be noted that as a concrete example of this communication means 300, LAN (Local Area Network) may be utilized in which the communication is performed by using protocol such as TCT/IP.

A description will now be made to an example of a process flow as well as a data flow within the system when representation of image data is instructed by actually using the keyboard 254 and mouse 255 by users.

For instance, a menu displayed on the CRT 251 is selected by the mouse 255, or a command is entered from the keyboard 254 by users, so that a display command for the image data is instructed to the terminal device 200. At this time, only a single document may be designated, but also a plurality of documents may be designated at a time. This may be performed by selecting a menu for designating image representation when, for instance, a list of document title is displayed on the CRT 251, after the user sequentially instructs only desirable document titles among the document tile list by using the mouse 255. Also, only specific portion of the document may be designated by physically or logically pointing out a portion of each document.

These user operations are analyzed by the operation analyzing means 202, thereby producing a data readout command to the data storage device 100. In this case, the operation analyzing means 202 refers to the data managing means 211 and produces a data readout command for transferring only data which has not yet been present in the terminal device 200 in such a case that a portion of data demanded by the user was already present within the terminal device 200 (i.e., data swapping means 209, received data temporary storage means 205, or display buffer 252). Here, the produced data readout command is transferred from the command transmission means 203 via the communication means 300 to the command receiving means 105 of the data storage apparatus 100.

Upon receipt of the data readout command derived from the terminal device 200, the command receiving means 105 decodes this command so as to find out data required to be transferred to the terminal device 200. This decoded result is sent to the data reading means 102. The decoded result by the command receiving means 105 is formed by an identifier such as a title of a document and a serial number thereof, and also another identifier for designating a specific portion within this document. The latter-mentioned identifier for designating a specific portion in a document implies such an identifier for physically designating a "full text" and a "front page" in case of a patent specification, or for logically designating an attribute within a page, such as a "claim" data a "figure". Also, this identifier may logically and physically designate, for instance, "pages 1 to 3 of the figure pages".

Upon receipt of the decoded result made by the command receiving means 105, the data reading means 102 forms titles of all documents read out the data storage means 101, or a document list read out therefrom, which corresponds to a list of serial numbers, and also produces a page list corresponding to a list of all pages which are read out with respect to the respective documents within the document list. When this page list is produced, the data reading mean 102 interrogates to the management information reading means 104. With such an interrogation, the data reading means 102 obtains attribute information of a document to be transferred. This attribute information is arranged by document management information and data management information. The document management information corresponds to such an information for managing both a logical attribute and a physical attribute of each page within a document. The data management information corresponds to such an information for managing a capacity of each image data and also a storage position within the data storage means 101.

The data reading means 102 finds out a position at which both the management information and the respective image data thereof within a series of data to be transmitted are stored, based upon the management information and the capacity of image data described in the page list which will be subsequently transmitted, thereby producing the control information. In the control information, there are described the title of the data, the byte length thereof and the storage position. Next, both this control information and the management information of the document to be transferred are transferred to the transmission data temporary storage means 107. In the transmission data temporary storage means, these fetches data are stored. When the capacity of the data which have been stored in the transmission data temporary storage means 107 exceeds a predetermined transfer amount defined by the system, the data having a predetermined transfer amount is transferred by the data transmitting means 106 via the communication means 300 to the terminal device 200. The data transfer operation of the data having a predetermined transfer amount is repeated until the remaining capacity of the stored data becomes below than a predetermined transfer amount.

Subsequently, the data reading means 102 reads out from the data storage means 101 in a unit of page, each of the image data which have been listed in the page list. The read data are transferred to the transmission data temporary storage means 107. The data reading means 102 performs this transferring process with respect to all of pages present in the above-described page list. When the image data are transferred to the transmission data temporary storage means 107, if the capacity of the stored data exceeds a predetermined transfer amount previously defined by the system, the data transmitting means 106 transfers the data having a predetermined transfer amount via the communication means 300 to the terminal device 200. This data transfer operation is executed by repeatedly transferring the data having a predetermined transfer amount until the capacity of the remaining data stored in the transmission data temporary means 107 becomes below than a predetermined transfer amount. When the data on the last page in the page list has been transferred to the transmission data temporary storage means 107 by the data reading means 102, a fact that this transferred data corresponds to the last data among the document under process is reported to the data transmitting means 106. In this case, the data transmission means 106 first transfers the data in a unit of predetermine transfer amount until the remaining capacity of the data stored with the transmission data temporary storage means 107 is lower than a predetermined transfer amount, and finally transfers the data having a remaining transfer amount below than a predetermined transfer amount. With this data transfer operation, the data transfer operation in a unit of document is accomplished from the data storage device 100 to the terminal device 200.

In the data storage device 100, a series of document data transfer process is repeated with respect to the respective documents within the document list which has been produced previously in the data reading means 102, whereby the transfer operation of the document data instructed by the terminal device 200 is completed. The data transfer operation is carried out in a unit of the above-described predetermined transfer amount in the preferred embodiment. Further, when the data on the last page within the document is transferred, the data transfer operation is performed in a unit of the transfer amount lower than the above-described predetermined transfer amount. The data receiving means 204 stores the received data to the received data temporary storage means 205.

The received data temporary storage means 205 includes a plurality of buffers having the same capacity as the above-described predetermined transfer amount (will be referred to "segments"), and a management list of segments under use for managing a sequence by which the respective segments have been used by the data receiving means 204, and also an unused segment management list for managing the segments usable to store the data received by the data receiving means 204. Based upon these management lists, the segments having the same capacity as the above-described transfer amount are managed by way of a serial number or the like. The received data temporary storage means 205 is employed to temporarily store the received data, so that while cutting out the data having various capacities from the transferred data having a predetermined capacity the cut-out data is actually displayed for utilization. Since the number of the data transfer processing operations within the terminal device 200 may be suppressed by preparing a large storage capacity for the received data temporary storage means 205 and storing the received data therein, the processing efficiency in the system may be increased. In case that the data exceeding the capacity of this storage means 205 are received from the data storage device 100, the overflowed data is transferred to the data swapping means 209 so as to be stored therein (will be discussed later).

Upon receipt of the data from the data receiving means, the received data storage means 205 executes the following processes.

First, a segment number for storing the received data is obtained from the unused segment management list, and is deleted from this unused segment management list. A detail explanation will be made later as to a process operation when the segment number is not obtained from the unused segment management list. In other words, all of the segments of the received data temporary storage means 205 are under use. Thereafter, the received data is stored into the buffer segment corresponding to the segment number obtained from the unused segment management list, and this number is added to the last of the management list of the segment under use.

There is control information contained in the first data of the document which has been stored in the received data temporary storage means 205, which is analyzed by the control information analyzing means 206. With this analysis, the management information, sorts of the respective image data, storage positions, and byte lengths of the data are defined from a series of data which will be subsequently received by the terminal device 200.

When the data corresponding to the storage position of the management information which has been defined by the analysis by the control information analyzing means 206 is stored into the received data temporary storage means 205, this data is analyzed by the management information analyzing means 207. This analysis enables a document title of data which will be subsequently received, and also an attribute of each page with this document to be defined. The resultant analysis is transferred together with the analyzing result of the control information analyzing means 20 to the data managing means 211.

The display data cutting out means 208 cuts out image data if there exists a terminal of image data among the data which have been newly stored in the received data temporary storage means 205.

In this case, since both the storage position and capacity of the respective image data have been already determined based upon the analysis result of the control information analyzing means 206 under management by the data managing means 211, the display data cutting out means 208 may identify whether or not the terminal of the image data is present within the received data. The display data cutting out means 208 refers to the management list of segment under use with the received data temporary storage means 205 so as to cut out the overall image data.

The cut-out image data is transferred to the display buffer 252 by the display data transferring means 210. Similarly, this image data is transferred to the secondary storage device 219 employed in the data swapping means 209 by way of this data swapping means 209. Both the display buffer 252 and the storage position of the data at the secondary storage device 219 are managed by the data managing means 211.

Since the data displayed on the display means 201 is merely transferred to the frame memory, the transfer operation of the image data which has been transferred to the display buffer 252 may be executed at a high speed. However, since the display buffer 252 has a constant capacity, it is impossible to store all of the image data which have been supplied to the terminal device 200, into the display buffer 252. As a consequence, according to the present invention, the image data is temporarily saved by utilizing the data swapping means 209 within a storage medium having a lower cost than that of the display buffer 252. Then, when the image data is displayed, or when a judgement is made by the display control means 212 that there are higher possibilities that a display command is made by a user, the display control means 212 reads out the image data from the secondary storage device 219 of the data swapping means 209, and then transfers the read image data to the display buffer 252.

The reason why the display buffer 252 is employed in conjunction with the data swapping means 209, is to achieve the high-speed representation in accordance with the present invention. That is to say, if the image data is read out from the secondary storage device 219 of the data swapping means 209 and then transferred to the frame memory 253 at a time instant where a turning page command is issued from a user, the readout processing operation of particularly the data may take much time. As a result, the turning pages cannot be performed at a high speed. Accordingly, there is employed the display buffer 252 capable of storing a plurality of image data. Then, the image data have been previously transferred to this buffer 252 so that the turning-page processing operation may be performed at a high speed.

When the turning-page operation is carried out by a user with employment of the mouse 255 or the like, the operation analyzing means 202 analyzes this turning-page operation and send a command to the display control means 212. The display control means 212 refers the management information within the data management means 211 so as to obtain the storage position of the data to be displayed, within the terminal device 200. There are three storage positions for the data within the terminal device 200. That is to say, three storage positions are in the received data temporary storage means 205, the secondary storage device 219 of the data swapping means 209, and the display buffer 252. Also, there is such a case that the same data have been simultaneously stored in plural storage positions.

If there is no data to be displayed within the terminal device 200, a command is produced to read out such data from the data storage device 100 and is transmitted from the command transmitting means 203. The subsequent process effected within the system is similar to the above-described process.

In case that no image data designated for a representation purpose has been stored into the display buffer 252 employed in the display means 201, the display control means 212 performs the following control for the representation purpose. In this regard, there exists the following case as the storage position for the image data. First, the image data is present in the received data temporary storage means 205, and then the image data is stored in the secondary storage device 219 of the data swapping means 209. Furthermore, the image data have been stored into both the received data temporary storage means 205 and the secondary storage device 219.

When the image data has been stored in the received data temporary storage means 205, the image data is first cut out from the received data temporary storage means 205 by the display data cutting-out means 208. Next, this cut out image data is transferred by the display data transferring means 210 to the display buffer 252, and furthermore transferred to the frame memory 253, whereby the image data is displayed on the CRT 251.

When the image data has been stored only into the secondary storage device 219 of the data swapping means 219, the image data is first readout from the secondary storage device 219. Thereafter, the read image data is transferred by the display data transferring means 210 to the display buffer 252, and further transferred to the frame memory 253, whereby the image data is displayed on the CRT 251.

If the data transfer operation is executed within the terminal device 200, the data management information of the data managing means 211 is similarly updated with reflecting the result of the data transfer operation.

It should be understood that when the image data have been stored into both the received data temporary storage means 205 and secondary storage device 219, the image data which has been stored into the received data temporary storage means 205 is transferred to the frame memory 253 in accordance with the above-described sequence so as to be displayed on the CRT 251.

To the contrary, when the designated image data has been stored in the display buffer 252, the display control means 212 controls the display means 201 to transfer this image data to the frame memory 253, thereby displaying the image data on the CRT 251. At this time, the data management information of the data managing means 211 is properly updated.

A process operation of the transmission data temporary storage means 107 within the data storage device 100, according to a preferred embodiment of the present invention, will now be described more in detail.

When the data transmitting means 106 transmits the data via the communication means 300 to the terminal device 200, the transmission data temporary storage means 107 has a function to subdivide the data which is to be sent out to the communication means 300, into packets each having a predetermined size. A data packet having a predetermined size is so-called as a "transfer packet". This transfer packet will be discussed in detail. The reason why the data transfer operation is carried out by utilizing the transfer packet having a predetermined size, is to increase the transfer efficiency. Since the data transfer operation is performed by employing the transfer packet having a predetermine size, it is no longer required to prepare for the data reception every time an amount of data to be transferred is reported in advance. When the data transfer operation is carried out in a unit of page, for instance, a total number of data transfer operations becomes greater than in case of the transfer packet transfer operation. In other words, when the data transfer operation is carried out by subdividing the data into the transfer packets, the overhead required for the transfer processing operation may be reduced so that the transfer efficiency is increased. A packet structure of data will be described with reference to FIG. 2, whereas a process flow according to a preferred embodiment of the present invention will be explained with reference to a PAD diagram shown in FIG. 3.

In the data storage device 100, based upon an analysis result of a data transfer command fetched from the terminal device 200 at a process 170 shown in FIG. 3, both the management information reading means 104 and data reading means 102 read out the data therefrom and transfer the read data to the transmission data temporary storage device 107. Document data transferred from the data storage device 100 via the communication means 300 to the terminal device 200 is performed in a unit of document. A group of data in a unit of document is called as a "document packet" which is indicated by reference numeral 301 shown in FIG. 2A. In accordance with a process operation of a preferred embodiment (will be described later), as represented in a process 171 of FIG. 3, the process operation is repeated in a unit of document with respect to all data which has been designated by the transfer command received by the command receiving means 105 at a process 170.

A document packet 301 is generated by a control data description region 302, a management data description region 303, and an image data storage region 304 (for instance, 304a and the like). The control data description region 302 describes control information 320 which corresponds to such information concerning storage positions and capacities for a content of the image data region 304, and a content of the management data description region 303 within the document packet 301. The content of the management data description region 303 will be discussed later more in detail.

Figure 2B:
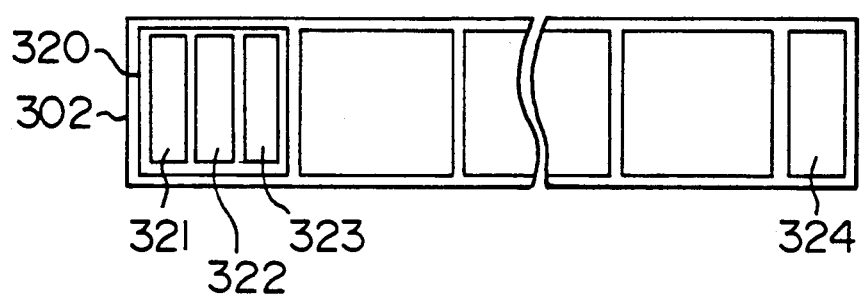
Figure 2C:
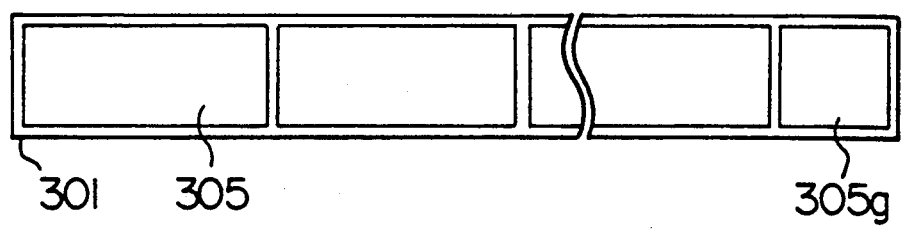

As represented in FIG. 2A, the control information 320 is constructed of a data classification identifier 321, data size information 322, and storage position information 323 related to this data within the document packet. An analysis of the control data description region 302 within the terminal device 200 is carried out by the control information analyzing means 206. An analyzed result thereof contains both the storage position and capacity of the data within the document packet, and is used by the display data cut out means 208 and the like. A termination identifier 324 is provided at the terminal or termination of the control data description region 302. The control data analyzing means 206 detects an end of the control information by this termination identifier 324.

The management data description region 303 describes information related to a page attribute or the like of a document transmitted in the document packet 301. As this information, for instance, there are described a page number of a document, and also physical and logical attributes of the respective pages. It should be noted that a "physical attribute" implies, for instance, a page number, and also a "logical attribute" implies a content described in a page such as "Claim" and "figure" in a patent document. A page number may be described in a unit of logical attribute. This implies "a first page of the figure pages" and the like. An analysis of the management data description region 303 within the terminal device 200 is performed by the management data analyzing means 207, and an analysis result is stored into the data managing means 211. Since both the storage position and capacity are present at the termination of the management data description region 303 as the analysis result by the control information analyzing means 206, the management information analyzing means 207 detects the termination by referring to them.

The image data storage region 304 is to store image data 304a transferred from the data storage device 100 to the terminal device 200. The storage positions and data sizes of the respective image data stored within the image data storage region 304 have been described in the above-described control data description region 302.

Both the control data description region 302 and management data description region 303 are produced by the management information reading means 104 with reference to the information which has been stored into the data attribute managing means 103. Both of the produced description regions are temporarily stored in the transmission data temporary storage means 107. This process corresponds to a process 172 shown in FIG. 3. At this time, when the amount of the data which have been stored in the transmission data temporary storage means 107 exceeds a predetermined data mount, the data transfer operation is performed from a process 173 to a process 175 until the data amount stored in the storage means 107 becomes below a predetermined value. Since the process operation as defined from the processes 173 to 175 is similar to that as defined from the processes 178 to 180 (will be discussed later), no detailed explanation is made in the specification.

Upon production of both the control data description region 302 and management data description region 303, the data reading means 102 successively reads the image data to be transferred from the data storage means 101 and thereafter sends the image data to the data temporary storage means 107. This process is carried out in a unit of page as represented in a process 176. Another process 177 represents such a processing operation to read the data. Once the data storage amount of the transmission data temporary means 107 exceeds a predetermined data transfer capacity, the data transmitting means 106 transmits the stored data in a unit of predetermined transfer capacity. A group of the data having a predetermined transfer amount corresponds to a transfer packet as indicated by reference numeral 305 shown in FIG. 2C.

It should be noted that the transfer packet 305 is cut out by the data transmitting means 106 from the transmission data temporary storage means 107 in a unit of predetermined transfer capacity without taking account of the contents of the data stored into the document packet 301 and also the respective boundaries.

In FIG. 3, when the amount of data which have been stored into the transmission data temporary storage means 107 at a process 178 exceeds a predetermined amount, the transfer packet is transmitted at a process 179, and the subsequent data are processed by utilizing a next transfer packet at a process 180. If the amount of the data which have been stored in the transmission data temporary storage means 107 has yet exceed a predetermined data amount at a time instant where the transfer packet had been transmitted at the previous process 179, the process operations as defined by the processes 179 and 180 are repeatedly performed until the data amount stored in the temporary storage means 107 becomes smaller than a predetermined data mount.

There are some possibilities that a size of the last transfer packet within the document packet 301 becomes smaller than a predetermined size. A detection that the transfer packet 305g corresponds to the last transfer packet among the document packet 301 in the data transmitting means 106, is realized by reporting to the data transmitting means 106 such a fact that the data transmitted to the transmission data temporary storage means 107 corresponds to the last page of the document during the data transferring operation.

Both of the data reading operation by the data reading means 102 and the data transferring operation by the data transmitting means 106 are executed in a pipeline mode. That is to say, the data transmitting means 106 transmits the transfer packet 305 at the time when the contents of this transfer packet 305 are grouped within the transmission data temporary storage means 107. It should be noted that although the above-described pipeline processing operation was executed in a unit of page in the preferred embodiment shown in FIG. 3, this processing unit may be alternatively substituted by another processing unit.

Figure 5A:
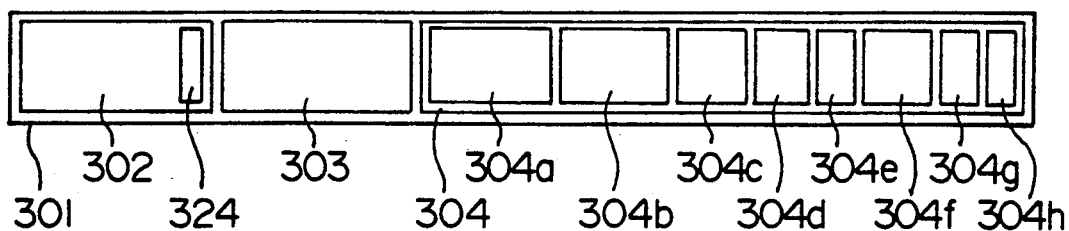
FIGS. 5A and 5B represent one example of a document packet.
Figure 5B:
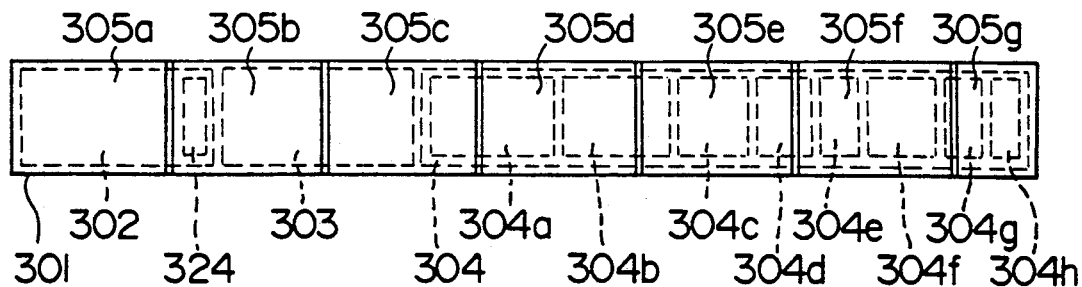
Figure 7:
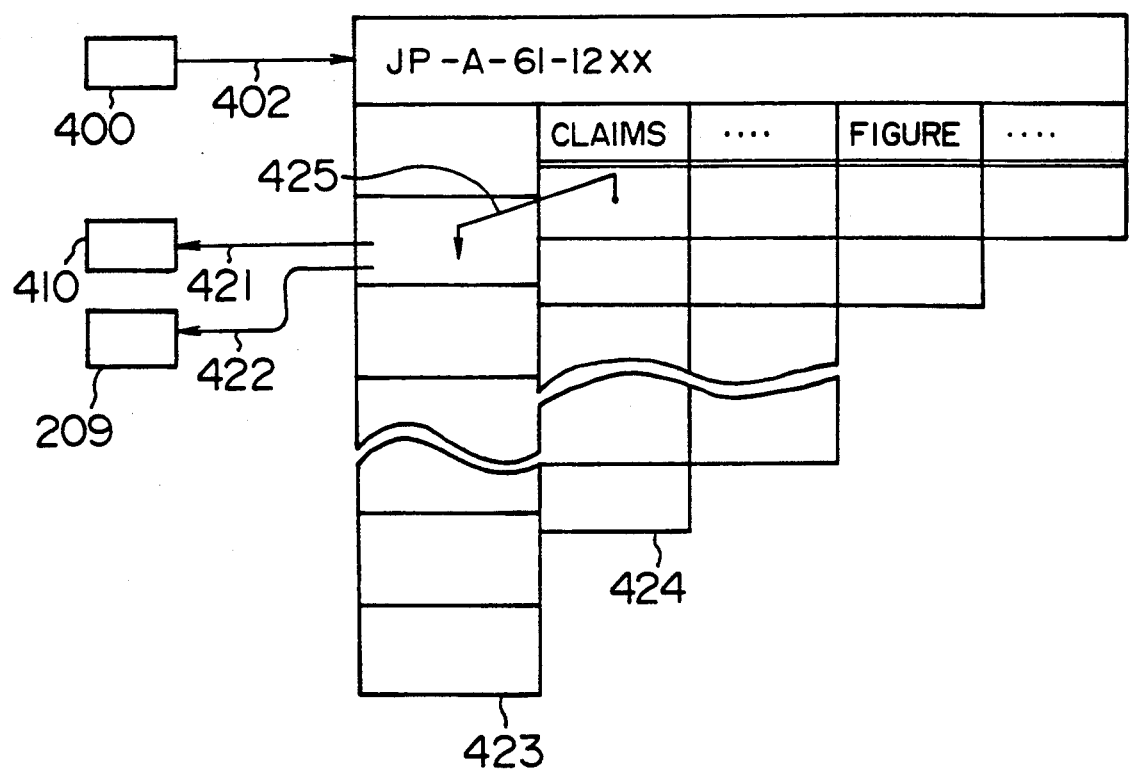

The transfer packet transmitted by the data transmitting means 106 is received via the communication means 300 by the data receiving means 204 employed in the terminal device 200. Both a content of process operations and a flow thereof with respect to the received data within the terminal device 200 will now be described in accordance with a preferred embodiment. In a PAD diagram shown in FIG. 4, there is briefly represented a flow of process operations. FIG. 5 represents one example of the document packet 301. As shown in FIG. 5A, the document packet 301 is arranged by the control data description region 302, management data description region 303 and image data having 8 pages as indicated by 304a to 304h. Also, as represented in FIG. 5A, 7 transfer packets from 305a to 305g are transferred from the data storage device 100 to the terminal device 200.

The following process operation according to a preferred embodiment will be repeatedly executed in a unit of document packet. The PAD diagram shown in FIG. 4 represents a process operation with respect to a single document. Two flags of FLAG1 and FLAG2 are prepared in the terminal device 200 for a data reception processing operation. When the document packet reception is commenced, both of these flags have been previously set to "ON" as represented in a process 271.

At a process 272, the transfer packet data received by the data receiving means 204 is temporarily stored into the received data temporary storage means 205. At this time, a plurality of transfer packets are stored into the received data temporary storage means 205, the storage positions of which are managed in accordance with arrival orders of the transfer packets. As a consequence, the data which has arrived as the subdivided transfer packets may be reproduced by mutually connecting these packets.

When the first transfer packet 305 in the document packet 301 is stored into the received data temporary storage means 205 by the data receiving means 205 by the data receiving means 204, since [FLAG 1" is under "ON" state at a process 273, the control information analyzing means 206 analyzes the control data description region 302 at a process 274. At this time, if there is no termination identifier 324 in the first transfer packet, the control information analyzing means 206 continues to analyze the transfer packets in accordance with the arrival order until the termination identifier 324 is found out. When the termination identifier 324 is found out, FLAG 1 is set to "OFF" state at a process 275. Then, the process operation jumps into "LABEL 1" of a label 275L and the process operations defined after the process 276 are executed with reference to an analysis result obtained at a process 274.

Since the termination identifier 324 is contained in the transfer packet 305b which arrives at a second order in the example of FIG. 5, a process operation defined at a process 275 is executed after the process operation 274 for the transfer packet 305b has been accomplished.

As a result of this analysis, the sorts of the data, the capacities thereof and the storage positions thereof in the document packet 301, which have been stored in the document packet 301 may be found out subsequently. Also, since FLAG 1 becomes the "OFF" state at the process 275, a process operation defined at a process 276 is performed after the process 273 while the document packet under process is being processed.

At this process 216, since FLAG 2 is under "ON" state, a process operation of a process 277 is executed. A detailed process content of this process 277 will now be described. That is, at a time instant when the transfer packet containing the termination or terminal of the management data description region 300 has been transferred into the received data temporary storage means 205, the management information analyzing means 207 executes the process operation defined at the process 272 based upon the analysis result obtained by the control information analyzing means 206, and cuts out the management data description region 303 for an analysis purpose. The analysis result is transferred to the data managing means 211 in a process 279 and managed therein. At this time, information related to the capacities and storage positions of the respective image data which have been stored in the image data storage unit 304 and transferred therefrom among the analysis results obtained from the control information analyzing means 206, is transferred to the data managing means 211, and then managed therein together with the previous analysis results obtained from the management information analyzing means 207. In accordance with a process operation as defined at a process 280, "FLAG 2" is set to "OFF" state, this process operation jumps into LABEL 1 of a label 280L and thereafter process operations defined after a process 281 are executed. Since FLAG 2 is referred at a process 276 while the document packet under process is being processed, and thereafter the termination of the page data is founded out at a process 281.

In the example shown in FIG. 4, since the termination of the management data description region 303 is contained in the transfer packet 305c which arrives at a third order, after this transfer packet 305c has arrived, an analysis of the management data at a process 278, writing a management data analysis result into the data managing means 211 at a process 279, and updating FLAG 2 at a process 280, and also jumping into LABEL 2 are executed.

It should be noted that although the process operation defined as the process 278 is executed after the termination of the management data description region 303, there is another process operation. Even when no termination of the management data description region 303 is detected at the previous process 277, the process operation defined as the process 278 is performed with respect to the arrived data. In other words, even if no termination is found out at the process 277, the process operation similar to that of the process 278 is added. In accordance with the example of FIG. 5, an analysis is carried out only for a portion contained in the transfer packet 305b among the management data description region 303. If the judgement result at the process 277 becomes "YES", the process operation defined at a process 278 is performed in which an analysis is performed only for a portion contained in the transfer packet 305c among the management data description region 303. As a result, the process 278 may be performed during an empty time where the data is received, so that a time required after the first transfer packet has been received until the process operation defined at a process 280 may be shortened.

In the data managing means, the page attributes or the like of the document and also the storage positions of the respective pages within the terminal device 200 are managed. At this time, both the storage positions of the page data which already arrived and the storage positions of the page data contained in the transfer packets which will arrive are managed.

Referring now to the management information stored in the data managing means 211, the display data cut-out means 208 sequentially cuts out the page data from the transfer packets which have been stored in the received data temporary storage means 205. This cut-out process operation is performed as follows.

In the process 281, a detection is executed for all of the page data containing the terminations within the received transfer packets with reference to the management information with the data managing means 211. In the process 282, with respect to all of the page data detected in the process 281, both of a transfer process operation of the data at a process 283 (will be described) and updating of the data managing means 211 at a process 284 are performed.

The above-described page data the termination of which is contained in the received transfer packet implies the following page data. For instance, in the example of FIG. 4, there is no page data whose termination is contained in the transfer packet 305c. Then, the transfer packet 305d contains the termination of the page data 304a. Subsequently, two pages of the terminations 304b and 304c are contained in the transfer packet 305e; three pages of the terminations from 304d to 304f are contained in the transfer packet 305f, and two pages of the terminations 304g and 304h are contained in the last transfer packet 305g.

At the process operation defined as a process 283, the display data transferring means 210 transfers the cut-out page image data to the display buffer 252 of the display means 201, or to the data swapping means 209 under control of the display controlling means 212. When the data is transferred, the display controlling means 212 updates the management information of the data managing means 211 in accordance with the data transfer processing operation.

The display controlling means 212 controls the display data transferring means 210 to perform the data transfer operation from the data swapping means 209 to the display buffer 252 of the display means 201. Also in this case, the management information of the data managing means 211 is updated in accordance with the data transfer processing operation.

All of the information data which have been stored into the transfer packet storage region within the received data temporary storage means 205 are analyzed by either the information analyzing means 206 or 207. Also, with respect to the image data, after being swapped into the data swapping means 209, this transfer packet storage region is utilized as a transfer packet storage region which is again received by the data receiving means 204.

In the display controlling means 212, the transfer operation of the image data is controlled with employment of the algorithm as described in JP-A-1-134523 entitled "IMAGE DISPLAY APPARATUS". That is to say, such an image data having a higher potential that a user may produce a display demand by using the mouse 255, is previously transferred to the display buffer 252. Conversely, such an image data having a lower potential that a user may issue a display command by utilizing the mouse 255, is not stored into the display buffer 252, but stored into the data swapping means. It should be noted that image data having a higher potential implies, for instance, either a next page among the page being displayed, or a page of the figure being referred. Image data having a lower potential implies, for example, a page having no relationship with the page being displayed.

Actually to display the image data on the CRT 251, since only the image data to the displayed are merely transferred to the frame memory 253, if the image data have been previously transferred to the display buffer 252, the display may be executed at a high speed.

Also, in case that image data which have been compressed by way of the MMR (Modified Modified Reed) method are processed, the image data under compression are stored into the display buffer 252. When these compressed image data are transferred to the frame buffer 253 for a display purpose, a decompression process is performed for these image data, so that the image data more than those for the above-described processing operation may be stored into the display buffer 252. If a data decompression hardware is provided in a data path from the display buffer 252 to the frame memory 253, very fast display may be realized.

The data managing means 211 of the terminal device 200 according to a preferred embodiment will now be described.

Figure 6:
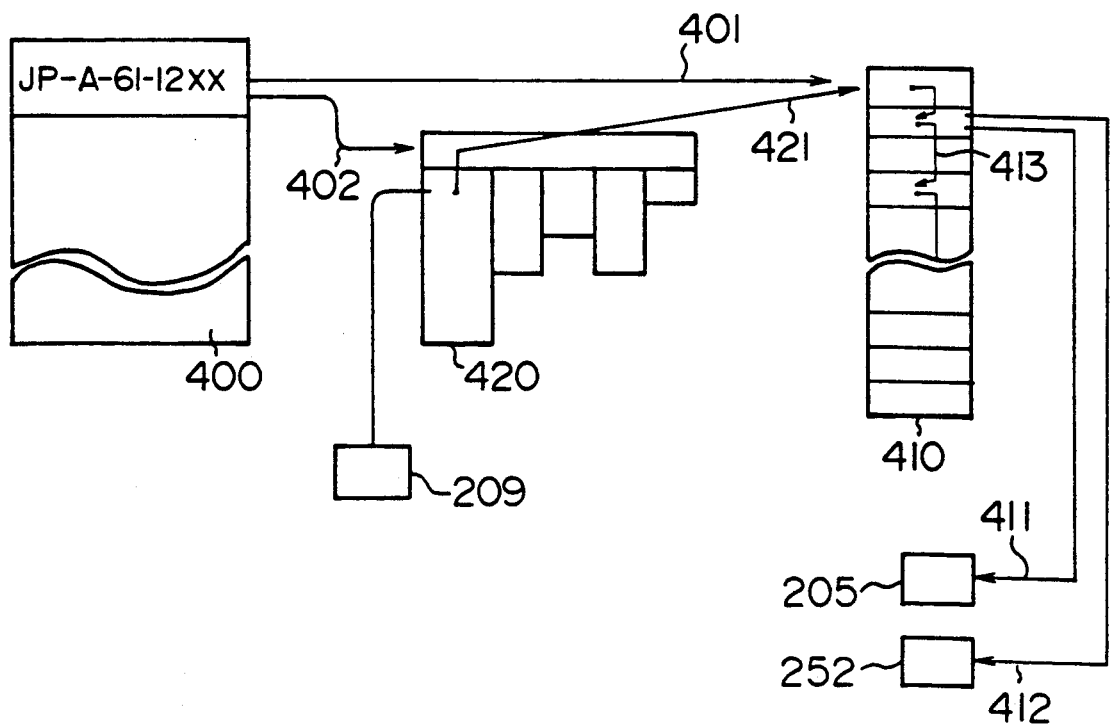
FIG. 6 schematically illustrates a preferred embodiment of data management means; and, FIG. 7 schematically illustrates a preferred embodiment of a document attribute management table.

In the data managing means 211, a management is made for both the storage positions of the page data and the attributes in the documents which have been stored in the terminal device 200. As shown in FIG. 6, the data managing means 211 is constructed of a document management table 400, a page data management table 410, and a document attribute management table 420.

The document data management table 400 corresponds to a list such as document titles and document numbers. In case of a patent document, this table corresponds to a list of "JPA" numbers. This document data management table 400 includes a pointer 401 between the page data management table 410 and therewith, and a pointer 402 between the document attribute table and therewith.

The page data management table 410 corresponds to a list of page data which have been stored into the terminal device 200. This management table 410 owns a pointer 411 between the received data temporary storage means 205 and therewith, and also a pointer 412 between the display buffer 252 and therewith. Furthermore, this table includes a pointer 413 for forming a data list of the same documents within this table.

Each of entries in the page data management table 410 is added to this table every time the page data has arrived, and the entries of the same documents are connected with each other by the pointer 413. This is required when data are received from the terminal device 200 at a time and a plurality of data storage devices 100 in such a system that a plurality of data storage devices 100 are employed to the communication means 300. This is because the data are successively transferred among the plural data storage devices 100 without any synchronization.

The document attribute management table 420 is such a table to manage page attributes or the like within a document. This management table 420 includes a pointer 421 between the page data management table 410 and therewith, and a pointer 422 for a file title by which the data swapping means 209 is accessed. A detailed description of the document attribute management table 420 pre se will be described later.

The document attribute management table 420 corresponds to a result obtained by analyzing the management data description region 303 by the management information analyzing means 207.

FIG. 7 represents the document attribute management table 420 according to a preferred embodiment. Reference numeral 402 indicates a pointer between this management table 400 and the document data management table 400, reference numeral 421 denotes a pointer between this management table 400 and the page data management table 410; and reference numeral 422 indicates a pointer used for a data structure to manage a file titles for accessing the data swapping means 209, and also a size of the corresponding data and a storage position thereof within the file.

The document attribute management table 420 has a physical attribute list 423 and a logical attribute table 424.

The physical attribute list 423 corresponds to a list for each page of a document managed by this table. The logical attribute table 424 is constructed by arranging the respective pages of the document managed by this table into a list in a unit of page attribute. A pointer 425 corresponds to a pointer for managing a relationship between the physical attribute list 423 and logical attribute table 424. The storage position of the page data corresponding to the respective entries within the document packet 301 is described in this physical attribute table 423.

This information is generated by analyzing the control data description region 302 by the control information analyzing means 206.

The pointer 402 is realized in such a manner that the memory address of the document entry corresponding to that in the document data management table 400 is stored within the document attribute management table 420. Also, this pointer may be realized in such a manner that the number of the corresponding document entry within the table 400 is stored in the document attribute management table 420, and the memory address of the first entry within the table 400 is stored into the shared region within the system.

The pointer 403 is equipped with each entry of the physical attribute list 423, and points out the corresponding entry of the page data management table 410. A realizing method of this pointer is similar to that of the pointer 402. That is to say, this pointer 403 is realized by storing the memory address of the corresponding page entry within the page data management table 410 into the physical attribute list 423. Also, this pointer 403 may be realized by storing the memory address of the first entry in the table 410 into the shared region in the system, while storing the number of the corresponding page entry in the table 410 into the physical attribute list 423.

The pointer 422 points out the storage positions of the data corresponding to the respective entries of the document attribute management table 420 within the data swapping means 209. The realizing method of the pointer 422 depends upon that of the data swapping means 209.

As the data swapping means 209, a random-accessible file system is employed, one file per a single document is utilized and page data are sequentially stored. In this case, the pointer 422 is realized by the following method. That is to say, file titles are stored into one memory region within the document attribute management table 420, and then the storage positions of the data within this file are set into the corresponding entry of the physical attribute list 423 by an offset value from a head file.

Furthermore, as the data swapping means 209, data having one page may be stored into a single file. In this case, the pointer 422 may be realized by the following method. That is to say, the file titles may be set to the corresponding entry of the physical attribute list 423 as the data swapping means 209.

The logical attribute table 424 corresponds to such a table for managing the page attributes within the document in a unit of page logic attribute. In case of, for example, a patent document, there are page attributes of "claims" "description", "figure" and "abstract" and the like. The respective page attributes are managed in a list form. The pointer 425 is such a pointer for relating both the respective entries of the logic attribute table 424 and the corresponding entries of the physical attribute table 423. If, for instance, a first page of "claims" is equal to a first page within a document, a first entry of a list for managing "claims" of the logic attribute table 424 is connected to a first pointer of the physical attribute table 423 by the pointer 425.

To judge at a high speed whether or not desirable page data has been stored in the terminal device 200 when, for instance, the document attribute management table 420 is referred, a bit field for managing data may be provided in the document attribute management table 420. In other words, there are provided bit fields having bit widths whose number is equal to the entry number of the physical attribute list 420, a bit corresponding to such a page into which the data has not yet been stored into the terminal device 200 is set to "0", and also a bit corresponding to such a page into which the data has been stored is set to "1". With employment of this bit field for data management, when the storage position of the desirable page data with respect to the terminal device 200 is obtained, and this data is not present within the terminal device 200, the process operation required for transmitting the data transfer command to the data storage device 100 may be immediately performed. This is because whether or not the data is present can be judged by referring only to the bit field, but not performing the pointer operation.

Turning pages may be executed by way of various methods by any user on the terminal device 200, since the data managing means 211 is employed as previously described in the preferred embodiment. For instance, the page number is designated to realize the page turning operation, and also the logical attribute of the page is designated to realize the page turning operation. This designates, for example, "next page" and "page of figure". Also, with respect to plural documents, it is possible to observe successively only pages of the desirable attribute pages. For instance, a selection is made to display only pages on which "first figures" of plural patent documents are described, and only "first figures" may be sequentially observed. This page turning method is useful for such a case that when the patent documents and the like are retrieved, several tens to several hundreds of nominees are first selected by way of a mechanical retrieval and thereafter only most relevant patent documents are searched at a high speed.

Although the document data have been stored as the image data into the data storage device 100 in the above-described preferred embodiment, these document data may be stored as electronic data other than the image data. For instance, it is such a case that document data, so-called "mixed mode data" in which both character code data and image data are mixed is handled. In case of the mixed mode data, both real data constructed of the character code data and the image data, and also control information how to arranged these real data for a display purpose are present as a portion of the document data. To display the mixed mode data, this control information must be first analyzed. In this case, when the display data transferring means 210 transfers the data to the display buffer 252, since this control information has been analyzed, no analysis is needed in a practical case during the representation of this data. Therefore, the display processing operation may be performed at a high speed.

The data swapping means 209 may be realized in accordance with the following method other than the above-described methods in this preferred embodiment. That is to say, when a single document is stored into a single file, the document attribute management table 420 is stored as a head of this file. As a consequence, since the document attribute management tables 420 for all documents existing in the terminal device 200 are no longer spread in the data managing means 211, an amount of memories required in the data managing means 211 may be reduced. In this case, there is the following condition to spread the stored document attribute management table 420 as the file header of the data swapping means 209 on the memories of the data managing means 211. For instance, if a certain page of a certain document has been stored into the display buffer 252, a table thereof is spread in the data managing means 211. To the contrary, if even data having one page of this document has not yet been stored into the display buffer 252, the document attribute management table 420 of this document is not spread, but managed only within the data swapping means 209. In this case, it may be possible to employ a status flag indicating whether or not the document attribute management table 420 has been spread in the data managing means 211, to each entry of the document data management table 400.

A detailed description will now be made of a command issued from the terminal device 200 to the data storage device 100 with reference to an example. It is assumed in this example that an object for using a document information system to which the present invention has been applied is retrieved. That is to say, it is an object, as in the patent information system and the like, to search prior art with respect to a certain patent document at a high speed.

A device 400 used only for a retrieval purpose other than the terminal device 200 and data storage device 100 are connected to the communication means 300. While entering retrieval keywords by the terminal device 200, a user may access this retrieving device 400 to retrieve prior art.

To observe a content of a document list obtained in the retrieval operation, a data reading command is produced based upon the document list, the document data is read out from the data storage device 100, and thus this document data is displayed on the terminal device 200 so as to read the content of the document list.

Briefly speaking, there are two accessing modes to the data storage device 100 during the retrieving job. In accordance with the first accessing method, at an initial retrieving stage in which the retrieval results do not come to a goal, only summaries of a large quantity of documents are successively observed, whereby a user himself tries to find out a desirable item. This "summary" implies a portion of "claim" and another portion representative of a feature contained in "figure" and the like in case of, for instance, a patent document. Furthermore, there is such a case, as the first accessing method that only the summaries of a large quantity of documents are observed, whereby confirmation is made to justify the retrieving operation effected by the user.

The second access method is such a case that an overall document is precisely read at a final retrieval stage where several retrieving results could be found out. Even when any of these access methods is employed, both a high-speed transfer operation of image data and a high-speed data display are necessarily required for a document terminal system. To achieve such high-speed processing operations, the above-described various means are employed in the preferred embodiment, the following commands for the data storage device 100 are prepared from the terminal device 200, thereby needs for the retrieval system to be satisfied.

First, with respect to a read command of image data for the data storage device 100, it is necessary to be able to designate read out operation for a plurality of documents at a time. This is because there are many cases that several documents are to be searched as a result of retrieval operation. When a command to designate these plural documents is sent out from the command transmitting means 203, the document table management table 400 is produced in the data managing means 211.

In the data storage device 100, the document packets 301 are produced with respect to the respective commands, and then are transferred to the terminal device 200 in a unit of transfer packet 305. Among the data received by the data receiving means 204, both the control data description region 302 and management data description region 303 are analyzed by the analyzing means 206 and 207 respectively, the document data management table 400 is produced in the data managing means 211, and then is linked with the corresponding entry and pointer 402 of the produced document data management table 400. When the display data cut-out means 208 cuts out the document data from the received data, this cut-out data is registered into the page data management table 410 and also is linked to the document data management table 400 within the data managing means 211 by the pointer 401, and further to the document attribute management table 420 by the pointer 421.

When the document data to be read by the terminal device 200 have been distributed and stored into a plurality of data storage devices 100, commands are transferred to a plurality of data storage devices 100 at a time. Then, the data which have been separately transferred from the respective data storage devices are successively received by the data receiving means 204. At this time, since the transfer packets 305 are transferred from the plural data storage devices to the received data temporary storage means 205, a list of memory segments into which these transfer packets 305 have been stored in a unit of each document must be managed.

The pointer 411 of the document data management table 400 with respect to the received data temporary storage means 205 may access a first memory segment among the list of the memory segments into which these transfer packets 305 have been stored.

Also, with respect to the transfer packets, all of which contents have been stored into the terminal device 200 by the display data cut-out means 208 or the like, among the stored transfer packets, the memory segment within the received data temporary storage means 205 which has stored these transfer packets is deprived from the list for managing this document packet 301, and then is newly used for storing the transfer packet 305 received by the data receiving means 204. At this time, the pointer 411 for the received data temporary storage means 205 is updated, and such a management is performed that the transfer packet 305 within the memory segment designated by this pointer 411 corresponds to which packet within the document packet 301.

A command for reading out the image data for the data storage device 100 may designate such that a plurality of documents are read out at a time, and also the respective designated documents may be partially read out. As to this designation, a partial designation may be physically realized by a page number, and also a partial designation may be logically realized by a page content. Both the physical designation and logical designation are simultaneously achieved, and moreover the partial designation may be physically effected among the logical designation.

Also when a command for partially reading a document is received, the data storage device 100 produces as the management data description region 303, a region relating to an overall document and transfers it. As a result, in the data managing means 211, the document attribute management table 420 concerning the overall document is produced. As a result, when the data of the document which has been previously and partially stored into the terminal device 200 is read out from the data storage device 100, this document attribute management table 420 is referred, so that a command for reading out only the document data which has not yet been stored may be issued and transferred. As a result, since the total amount of data transferred via the communication means 300 can be reduced, the entire process efficiency can be increased and therefore the transfer operation of the document data may be achieved at a high speed.

As to the commands for the data storage device 100, a mode designation command for designating a transfer mode other than a command for reading the image data are prepared. This is to set the mode by previously using the exclusively used command, as previously explained, when the command for reading the document data is employed for a partial designation. When the transfer mode is designated by this mode designation command, the document designated by the data read command subsequently produced is transferred after the data is partially read out from the data storage device 100 by the previously designated mode. In particular, this is very useful in such a case that only summaries of a plenty of documents are observed on the terminal device 200 at the initial retrieving stage. That is to say, this is particularly useful for such a case that there are many possibilities that only a certain portion of each document, for instance, "a first figure" of each patent document is successively searched at the initial retrieving stage.

In this case, in response to a user's demand, turning pages is executed at a relatively high speed. To realize such a high-speed turning pages in a system, there is a need for accessing data at a high speed. Only necessary data must be transferred to the terminal device 200 from the data storage device 100.

Furthermore, when the mode is set by the mode designation command, if the data storage device 100 receives the read command for designating the partial readout of the document, as previously explained, the data is read out in the mode designated by the read command with a priority and then is transferred.

Taking account of a flow of a retrieval job, the partial designation of the read/transfer operation for the document data must be set as follows. Namely a user can make a designation when the read command of the document data is issued, and also the terminal device 200 can automatically set the partial designation in accordance with a total number of the designated documents.

For instance, a designation is made of the partial data transfer operation when there are many numbers of the documents to be read out, whereas another designation is made of the overall document transfer operation when there is a small number of the documents. In case that the partial transfer operation is designated, designations may be automatically made which part should be transferred, depending upon the users. This may be realized in such a way that such a fact which portion with in the document constitutes the most important portion thereof to be determined by a user, has been previously registered in the system. Similarly, this may be realized in such a way that a means for managing an operation history by a user is employed in the terminal device 200, into which both the modes previously designated by the user and the total number of the documents in these modes are registered, and the historical information is referred.

If turning pages is executed by a user on the terminal device 200, the below-mentioned commands may be issued. These commands may be displayed as a menu on the display screen 251, or represented to a user as a pop-up menu which has been clustered every sort of commands, and the corresponding command is designated by the mouse 255 so as to be inputted. As the commands, document designating commands such as "a next document" and "a front document" other than the page designating commands, e.g., "a next page" and "a front page" may be prepared. Also, the page logical designating command such as "a claim" and "a figure" may be prepared.

When the document designating command is used, a mode for turning documents by the page logical designation may be set. Not only a "manual turning-pages" mode in which the turning page process is carried out every time the menu is designated, but also an "automatic turning-pages" mode in which the turning page process is successively executed in a predetermined time interval may be employed. This corresponds to such a function that, for instance, only the pages of plural patent documents on which "first figures" are described are automatically turned every 1 second. It should be understood that this time interval may be automatically set, depending upon the users or displayed contents.

For example, this time interval may be shortened in case of turning figure pages, whereas this time interval may be prolonged in case of turning document pages, conversely. The above-described time intervals for turning pages may be previously set by a user, depending upon own operation pattern, and furthermore may be automatically set in such a manner that a means for managing an operation history by a user is employed in the terminal device 200, into which the operation interval of the "manual turning pages" operation previously performed by the user has been registered, and this historical information is referred.

In accordance with the present invention, since a time after a user has issued a display command until the data is actually displayed may be shortened particularly in such a system that data storage devices and terminal devices have been distributively arranged, the system may be made more comfortable.

The preferred embodiments described herein are therefore illustrative and not restrictive, the scope of the invention being indicated by the appended claims and all variations which come within the meaning of the claims are intended to be embraced therein.

We claim:

1. A document information system comprising:
a data storage apparatus including:
data storage means for electronically processing document data and management information for the document data so as to be stored therein;
command receiving means for receiving a command to instruct a reading operation of the stored document data;
data reading means for reading the document data from the data storage means based upon the command received from the command receiving means;
transmission data temporary storage means for temporarily storing the document data which has been read out therefrom by the data reading means; and
data transmitting means for transmitting the document data in document units at one of time instants when a storage amount of the transmission data temporary storage means reaches a predetermined transfer amount, and when a termination of last data of the designated document data is read out by the data reading means;
a terminal apparatus including:
operation analyzing means for fetching an operation by a user so as to be analyzed;
command transmitting means for producing a command based upon an analysis result of the operation, to thereby transmit the command to the data storage apparatus;
data receiving means for receiving the document data which has been transferred from the data storage apparatus; and
display means for displaying thereon the received document data; and also,
communication means for transferring both the command from the command transmitting means of the terminal apparatus to the command receiving means of the data storage apparatus, and the document data from the data transmitting means of the data storage apparatus to the data receiving means of the terminal apparatus, and also for controlling the transfer operations.

2. A document information system comprising:

a data storage apparatus including:

data storage means for electronically processing document data and management information for the document data so as to be stored therein;

command receiving means for receiving a command derived from an external apparatus, to instruct a reading operation of the stored document data;

data reading means for reading the document data from the data storage means based upon the command received from the command receiving means; and data transmitting means for transmitting the read document data in document units;

a terminal apparatus including:

operation analyzing means for fetching an operation by a user so as to be analyzed;

command transmitting means for transmitting a command based upon an analysis result of the operation, to thereby transmit the command to the data storage apparatus;

data receiving means for receiving the document data which has been transferred from the data storage apparatus;

received data temporary storage means for temporarily storing the document data received by the data receiving means as display data;

data swapping means for storing a portion of the document data received by the data receiving means as display data into a secondary storage device in order to be managed;

display data transferring means for cutting out the display data and for transferring the cut-out display data from the received data temporary storage means to a display buffer, or from the secondary storage device to the display buffer; and display means for displaying thereon the display data in a predetermined unit of a page, which has been transferred by the display data transferring means to the display buffer; and also, communication means for transferring both the command from the command transmitting means of the terminal apparatus to the command receiving means of the data storage apparatus, and the data from the data transmitting means to the data receiving means of the terminal apparatus, and also for controlling the transfer operations.

3. A document information system as claimed in claim 2, wherein said terminal apparatus includes:

display controlling means for transmitting a control command to said display data transferring means and said display means in response to the operation analysis result of the user with reference to said data management means, and also for updating the data management information.

4. A document information system comprising:

a data storage apparatus including:

data storage means for electronically processing document data and management information for the document data so as to be stored therein;

command receiving means for receiving a command to instruct a reading operation of the stored document data;

data reading means for reading the document data from the data storage means based upon the command received from the command receiving means;

transmission data temporary storage means for temporarily storing the document data which has been read out therefrom by the data reading means; and data transmitting means for transmitting the document data in document units at one of time instants when a storage amount of the transmission data temporary storage means reaches a predetermined transfer amount, and also a termination of last data of the designated document data is read out by the data reading means;

a terminal apparatus including;

operation analyzing means for fetching an operation by a user so as to be analyzed;

command transmitting means for transmitting command based upon an analysis result of the operation, to thereby transmit the command to the data storage apparatus;

data receiving means for receiving the document data which has been transferred from the data storage apparatus;

received data temporary storage means for temporarily storing the document data received by the data receiving means as display data;

data swapping means for storing a portion of the document data received by the data receiving means as display data into a secondary storage device in order to be managed;

display data transferring means for cutting out the display data and for transferring the cut-out display data from the received data temporary storage means to a display buffer, or from the secondary storage device to the display buffer;

data management means for managing storage positions of the display data at the received data temporary storage means, secondary storage device and display buffer; and display means for displaying thereon the display data in a predetermined unit of a page, which has been transferred by the display data transferring means to the display buffer; and also, communication means for transferring both the command from the command transmitting means of the terminal apparatus to the command receiving means of the data storage apparatus, and the data from the data transmitting means to the data receiving means of the terminal apparatus, and also for controlling the transfer operations.

5. A document information system as claimed in claim 4, wherein said terminal apparatus includes:

display controlling means for transmitting a control command to said display data transferring means and said display means in response to the operation analysis result of the user with reference to said data management means, and also for updating the data management information.

6. A document information system as claimed in claim 4, wherein said data storage apparatus includes:

data attribute management means for storing therein management information to manage an attribute of the stored document data; and management information reading means for reading the management information from said data attribute management means;

said transmission data temporary storage means for temporarily storing therein also the management information read out by said management information reading means;

said terminal apparatus includes management information analyzing means for cutting out the received management information so as to be analyzed; and, said data management means for managing also the management information which has been analyzed by said management information analyzing means, whereby a selection is made of the document data to be transferred or displayed.

7. A document information system as claimed in claim 4, wherein said command transmitting means of the terminal apparatus includes means for instructing at a time, a plurality of document data to be transferred; said data reading means of the data storage apparatus sequentially reads a plurality of designated document data; and, said data transmitting means transmits the document data via the communication means to the data receiving means at one of the time instants when the storage amount of the transmission data temporary storage means reaches said predetermined transfer amount, and also said termination of the last data of the document data is read out by the data reading means.

8. A document information system as claimed in claim 6, wherein said command transmitting means of the terminal apparatus includes means for instructing only the document data each having specific management information to be transferred among the document data for designating a transfer operation; said data reading means of the data storage apparatus sequentially reads a plurality of designated document data; and, said data transmitting means transmits the document data via the communication means to the data receiving means at one of the time instants when the storage amount of the transmission data temporary storage means reaches said predetermined transfer amount, and also said termination of the last data of the document data is read out by the data reading means.

9. A document information system as claimed in claim 6, wherein said command transmitting means of the terminal apparatus includes means for transmitting an instruction to restrict that only the document data having specific management information among the document data which are subsequently designated for the transfer operation, is transferred; said command receiving means of the data storage apparatus analyzes the received instruction and transfers an analysis result to the data reading means; said data reading means of the data storage apparatus sequentially read only the data having the management information which has been restricted by said instruction of the document data subsequently designated; and, said data transmitting means transmits the document data via the communication means to the data receiving means at one of the time instants when the storage amount of the transmission data temporary storage means reaches said predetermined transfer amount, and also said termination of the last data of the document data is read out by the data reading means.

10. A document data transfer and display method for reading both document data and management information for the document data stored via communication means into a data storage apparatus and for transferring the read document data to a terminal apparatus so as to be displayed thereon in response to an operation made from the terminal apparatus, comprising the steps of:

in the terminal apparatus, fetching an operation made by a user so as to analyze a content of the operation, producing a command based upon a result of the analysis, and transmitting the command via the communication means to the data storage means;

in the data storage apparatus, receiving the command, reading the document data stored within the data storage apparatus based upon the command, temporarily storing therein the read document data, and transferring said document data, in document units, via the communication means to the terminal apparatus under at least one of such conditions when a storage amount reaches a predetermined transfer amount, and also a termination of final data of the designated document; and, in the terminal apparatus, receiving the transferred document data so as to be displayed thereon.

11. A document data transfer and display method for reading both document data and management information for the document data stored via communication means into a data storage apparatus and for transferring the read document data to a terminal apparatus so as to be displayed there in response to an operation made from the terminal apparatus, comprising the steps of:

in the terminal apparatus, fetching an operation made by a user so as to analyze a content of the operation, producing a command based upon a result of the analysis, and transmitting the command via the communication means to the data storage means;

in the data storage apparatus, receiving the command, reading the document data stored within the data storage apparatus based upon the command, and transferring the document data, in document units, via the communication means to the terminal apparatus; and, in the terminal apparatus, receiving the transferred document data so as to be displayed thereon, temporarily storing the received document data as display data, swapping the received document data as display data to a secondary storage device when the received document data is not temporarily stored, transferring either the display data temporarily stored, or the display data swapped to the secondary storage device to a display buffer, and displaying the transferred display data in a unit of a page.

12. A document data transfer and display method for reading both document data and management information for the document data stored via communication means into a data storage apparatus and for transferring the read document data to a terminal apparatus so as to be displayed thereon in response to an operation made from the terminal apparatus, comprising the steps of:

in the terminal apparatus, fetching an operation made by a user so as to analyze a content of the operation, producing a command based upon a result of the analysis, and transmitting the command via the communication means to the data storage means;

in the data storage apparatus, receiving the command, reading the document data stored within the data storage apparatus based upon the command, temporarily storing therein the read document data, and transferring said document data, in document units, via the communication means to the terminal apparatus under at least one of such conditions when a storage amount reaches a predetermined transfer amount, and also a termination of final data of the designated document; and, in the terminal apparatus, receiving the transferred document data so as to be displayed thereon, temporarily storing the received document data as display data, swapping the received document data as display data to a secondary storage device when the received document data is not temporarily stored, transferring either the display data temporarily stored, or the display data swapped to the secondary storage device to a display buffer, and displaying the transferred display data in a unit of a page.

13. A document information system comprising:
a data storage apparatus including:
data storage means for electronically processing document data so as to be stored therein;
data attribute management means for storing therein management information to manage an attribute of the stored document data;
management information reading means for reading the management information from said data attribute management means;
command receiving means for receiving a command to instruct a reading operation of the stored document data;
data reading means for reading the document data from the data storage means based upon the command received from the command receiving means;
transmission data temporary storage means for temporarily storing the document data which has been read out therefrom by the data reading means; and
data transmitting means for transmitting the document data at one of time instants when a storage amount of the transmission data temporary storage means reaches a predetermined transfer amount, and when a termination of last data of the designated document data is read out by the data reading means;
a terminal apparatus including:
operation analyzing means for fetching an operation by a user so as to be analyzed;
command transmitting means for producing a command based upon an analysis result of the operation, to thereby transmit the command to the data storage apparatus;
data receiving means for receiving the document data which has been transferred from the data storage apparatus;
management information analyzing means for receiving management information from said data storage apparatus so as to be analyzed;
data management means for managing the management information which has been analyzed by said information analyzing means, whereby a selection is made of the document data to be transferred or displayed;
display means for displaying thereon the received document data; and
communication means for transferring both the command from the command transmitting means of the terminal apparatus to the command receiving means of the data storage apparatus, and the document data from the data transmitting means of the data storage apparatus to the data receiving means of the terminal apparatus, and also for controlling the transfer operations.

14. A document information system comprising:
a data storage apparatus including:
data storage means for electronically processing document data so as to be stored therein;
data attribute management means for storing therein management information to manage an attribute of the stored document data;
management information reading means for reading the management information from said data attribute management means;
command receiving means for receiving a command derived from an external apparatus, to instruct a reading operation of the stored document data;
data reading means for reading the document data from the data storage means based upon the command received from the command receiving means; and
data transmitting means for transmitting the read document data;
a terminal apparatus including:
operation analyzing means for fetching an operation by a user so as to be analyzed;
command transmitting means for transmitting a command based upon an analysis result of the operation, to thereby transmit the command to the data storage apparatus;
data receiving means for receiving the document data which has been transferred from the data storage apparatus;
management information analyzing means for cutting out the received management information so as to be analyzed;
data management means for managing the management information which has analyzed by said information analyzing means, whereby a selection is made of the document data to be transferred or displayed;
received data temporary storage means for temporarily storing the document data received by the data receiving means as display data;
data swapping means for storing a portion of the document data received by the data receiving means as display data into a secondary storage device in order to be managed;
display data transferring means for cutting out the display data and for transferring the cut-out display data from the received data temporary storage means to a display buffer, or from the secondary storage device to the display buffer; and
display means for displaying thereon the display data in a predetermined unit of a page, which has been transferred by the display data transferring means to the display buffer; and also,
communication means for transferring both the command from the command transmitting means of the terminal apparatus to the command receiving means of the data storage apparatus, and the data from the data transmitting means to the data receiving means of the terminal apparatus, and also for controlling the transfer operations.

15. A document information system as claimed in claim 14, wherein said terminal apparatus includes:
display controlling means for transmitting a control command to said display data transferring means and said display means in response to the operation analysis result of the user with reference to said data management means, and also for updating the data management information.

16. A document information system comprising:
a data storage apparatus including:

data storage means for electronically processing document data so as to be stored therein;

data attribute management means for storing therein management information to manage an attribute of the stored document data;

management information reading means for reading the management information from said data attribute management means;

command receiving means for receiving a command to instruct a reading operation of the stored document data;

data reading means for reading the document data from the data storage means based upon the command received from the command receiving means;

transmission data temporary storage means for temporarily storing the document data which has been read out therefrom by the data reading means; and data transmitting means for transmitting the document data at one of time instants when a storage amount of the transmission data temporary storage means reaches a predetermined transfer amount, and also a termination of last data of the designated document data is read out by the data reading means;

a terminal apparatus including:

operation analyzing means for fetching an operation by a user so as to be analyzed;

command transmitting means for transmitting command based upon an analysis result of the operation, to thereby transmit the command to the data storage apparatus;

data receiving means for receiving the document data which has been transferred from the data storage apparatus;

management information analyzing means for cutting out the received management information so as to be analyzed;

received data temporary storage means for temporarily storing the document data received by the data receiving means as display data;

data swapping means for storing a portion of the document data received by the data receiving means as display data into a secondary storage device in order to be managed;

display data transferring means for cutting out the display data and for transferring the cut-out display data from the received data temporary storage means to a display buffer, or from the secondary storage device to the display buffer;

data management means for managing storage positions of the display data at the received data temporary storage means, secondary storage device and display buffer and for managing the management information which has been analyzed by said management information analyzing means, whereby a selection is made of the document data to be transferred or displayed; and display means for displaying thereon the display data in a predetermined unit of a page, which has been transferred by the display data transferring means to the display buffer; and also, communication means for transferring both the command from the command transmitting means of the terminal apparatus to the command receiving means of the data storage apparatus, and the data from the data transmitting means to the data receiving means of the terminal apparatus, and also for controlling the transfer operations.

17. A document information system as claimed in claim 16, wherein said terminal apparatus includes:

display controlling means for transmitting a control command to said display data transferring means and said display means in response to the operation analysis result of the user with reference to said data management means, and also for updating the data management information.

18. A document information system as claimed in claim 4, wherein said command transmitting means of the terminal apparatus includes means for instructing at a time, a plurality of document data to be transferred; said data reading means of the data storage apparatus sequentially reads a plurality of designated document data; and said data transmitting means transmits the document data via the communication means to the data receiving means at one of the time instants when the storage amount of the transmission data temporary storage means reaches said predetermined transfer amount, and also said termination of the last data of the document data is read out by the data reading means.

19. A document information system as claimed in claim 13, wherein said command transmitting means of the terminal apparatus includes means for instructing only the document data each having specific management information to be transferred among the document data for designating a transfer operation;

said data reading means of the data storage apparatus sequentially reads a plurality of designated document data; and, said data transmitting means transmits the document data via the communication means to the data receiving means at one of the time instants when the storage amount of the transmission data temporary storage means reaches said predetermined transfer amount, and also said termination of the last data of the document data is read out by the data reading means.

20. A document information system as claimed in claim 14, wherein said command transmitting means of the terminal apparatus includes means for instructing only the document data each having specific management information to be transferred among the document data for designating a transfer operation;

said data reading means of the data storage apparatus sequentially reads a plurality of designated document data; and, said data transmitting means transmits the document data via the communication means to the data receiving means at one of the time instants when the storage amount of the transmission data temporary storage means reaches said predetermined transfer amount, and also said termination of the last data of the document data is read out by the data reading means.

21. A document information system as claimed in claim 16, wherein said command transmitting means of the terminal apparatus includes means for instructing only the document data each having specific management information to be transferred among the document data for designating a transfer operation;

said data reading means of the data storage apparatus sequentially reads a plurality of designated document data; and, said data transmitting means transmits the document data via the communication means to the data receiving means at one of the time instants when the storage amount of the transmission data temporary storage means reaches said predetermined transfer amount, and also said termination of the last data of the document data is read out by the data reading means.

22. A document information system as claimed in claim 13, wherein said command transmitting means of the terminal apparatus includes means for transmitting an instruction to restrict that only the document data having specific management information among the document data which are subsequently designated for the transfer operation, is transferred;

said command receiving means of the data storage apparatus analyzes the received instruction and transfers an analysis result to the data reading means;

said data reading means of the data storage apparatus sequentially reads only the data having the management information which has been restricted by said instruction of the document data subsequently designated; and, said data transmitting means transmits the document data via the communication means to the data receiving means at one of the time instants when the storage amount of the transmission data temporary storage means reaches said predetermined transfer amount, and also said termination of the last data of the document data is read out by the data reading means.

23. A document information system as claimed in claim 14, wherein said command transmitting means of the terminal apparatus includes means for transmitting an instruction to restrict that only the document data having specific management information among the document data which are subsequently designated for the transfer operation, is transferred;

said command receiving means of the data storage apparatus analyzes the received instruction and transfers an analysis result to the data reading means;

said data reading means of the data storage apparatus sequentially reads only the data having the management information which has been restricted by said instruction of the document data subsequently designated; and, said data transmitting means transmits the document data via the communication means to the data receiving means at one of the time instants when the storage amount of the transmission data temporary storage means reaches said predetermined transfer amount, and also said termination of the last data of the document data is read out by the data reading means.

24. A document information system as claimed in claim 16, wherein said command transmitting means of the terminal apparatus includes means for transmitting an instruction to restrict that only the document data having specific management information among the document data which are subsequently designated for the transfer operation, is transferred;

said command receiving means of the data storage apparatus analyzes the received instruction and transfers an analysis result to the data reading means;

said data reading means of the data storage apparatus sequentially reads only the data having the management information which has been restricted by said instruction of the document data subsequently designated; and, said data transmitting means transmits the document data via the communication means to the data receiving means at one of the time instants when the storage amount of the transmission data temporary storage means reaches said predetermined transfer amount, and also said termination of the last data of the document data is read out by the data reading means.

25. A document data transfer and display method for reading document data and management information, for managing an attribute of the document data, stored via communication means into a data storage apparatus and for transferring the read document data to a terminal apparatus so as to be displayed thereon in response to an operation made from the terminal apparatus, said method comprising the steps of:

in the terminal apparatus, extracting the management information so as to select the document data to be transferred or displayed fetching an operation made by a user so as to analyze a content of the operation, producing a command based upon a result of the analysis, and transmitting the command via the communication means to the data storage apparatus;

in the data storage apparatus, reading the management information, extracting the management information so as to select the document data to be transferred or displayed receiving the command, reading the document data stored within the data storage apparatus based upon the command, temporarily storing therein the read document data, and transferring said document data via the communication means to the terminal apparatus under at least one of such conditions when a storage amount reaches a predetermined transfer amount, and also a termination of final data of the designated document; and, in the terminal apparatus, receiving the transferred document data so as to be displayed thereon.

26. A document data transfer and display method for reading document data and management information, for managing an attribute of the document data, stored via communication means into a data storage apparatus and for transferring the read document data to a terminal apparatus so as to be displayed there in response to an operation made from the terminal apparatus, said method comprising the steps of:

in the terminal apparatus, fetching an operation made by a user so as to analyze a content of the operation, producing a command based upon a result of the analysis, and transmitting the command via the communication means to the data storage means;

in the data storage apparatus, reading the management information, receiving the command, reading the document data stored within the data storage apparatus based upon the command, and transferring the document data via the communication means to the terminal apparatus; and, in the terminal apparatus, extracting the management information so as to select the document data to be transferred or displayed receiving the transferred document data so as to be displayed thereon, temporarily storing the received document data as display data, swapping the received document data as display data to a secondary storage device when the received document data is not temporarily stored, transferring either the display data temporarily stored, or the display data swapped to the secondary storage device to a display buffer, and displaying the transferred display data in a unit of a page.

27. A document data transfer and display method for reading document data and management information, for managing an attribute of the document data, stored via communication means into a data storage apparatus and for transferring the read document data to a terminal apparatus so as to be displayed thereon in response to an operation made from the terminal apparatus, said method comprising the steps of:

in the terminal apparatus, fetching an operation made by a user os as to analyze a content of the operation, producing a command based upon a result of the analysis, and transmitting the command via the communication means to the data storage means;

in the data storage apparatus, receiving the command, reading the document data stored within the data storage apparatus based upon the command, temporarily storing therein the read document data, and transferring said document data via the communication means to the terminal apparatus under at least one of such conditions when a storage amount reaches a predetermined transfer amount, and also a termination of final data of the designated document; and, in the terminal apparatus, extracting the management information so as to select the document data to be transferred or displayed, receiving the transferred document data so as to be displayed thereon, temporarily storing the received document data as display data, swapping the received document data as display data to a secondary storage device when the received document data is not temporarily stored, transferring either the display data temporarily stored, or the display data swapped to the secondary storage device to a display buffer, and displaying the transferred display data in a unit of representation.

* * * * *